United States Patent [19]
Wilkerson

[11] Patent Number: 5,682,459
[45] Date of Patent: Oct. 28, 1997

[54] SPEED CONTROL FOR CONTROLLING THE SPEED OF A DC MOTOR

[76] Inventor: Alan W. Wilkerson, c/o The Gemini Company, W61 N14280 Taunton Ave. P.O. Box 380, Cedarburg, Wis. 53012

[21] Appl. No.: 507,855

[22] Filed: Jul. 27, 1995

[51] Int. Cl.$^6$ .................................................. G05F 1/10
[52] U.S. Cl. .......................... 388/821; 388/906; 388/811; 388/902; 318/109
[58] Field of Search .................................. 388/902, 910, 388/809–815, 907.2, 906; 318/105–108, 109–110; 363/65, 67, 68–70, 74; 323/234, 265, 271, 280

[56] References Cited

U.S. PATENT DOCUMENTS 5,351,336 9/1994 Wilkerson.

*Primary Examiner*—Karen Masih
*Attorney, Agent, or Firm*—Andrus, Sceales, Starke & Sawall

[57] ABSTRACT

A speed control for controlling the speed of a DC motor provides improved speed regulation during transient loading conditions. The control includes a regulating circuit having an output for controlling the armature voltage to the motor, An input speed reference signal corresponding to the desired speed is provided to the regulating circuit. A feedback signal proportional to armature voltage is also provided to the regulating circuit to establish an error signal for operating the control to regulate the voltage to the motor and therefore the motor speed, An IR compensating circuit provides increased motor voltage when the load increases. The voltage drop due to the armature circuit inductance is measured directly and also utilized to alter the output of the regulator to compensate for the inductive voltage drop occurring under transient loading conditions in a manner tending to establish the speed at the desired speed corresponding to the speed reference signal, during such conditions.

17 Claims, 4 Drawing Sheets

SPEED CONTROL FOR CONTROLLING THE SPEED OF A DC MOTOR

BACKGROUND OF THE INVENTION

The present invention relates to a control for regulating the speed of a DC motor by controlling the voltage applied to the armature of the motor. More particularly, the present invention is directed to a control providing improved speed regulation under conditions in which the motor is subjected to transient loading.

To provide the improved speed regulation, the armature voltage drop arising under transient loading conditions, due to the armature circuit inductance, is measured directly and utilized to alter the output of the regulator of the control in a manner tending to establish actual motor speed at that corresponding to a desired speed.

It is well known that the speed of a DC motor can be readily controlled by varying the DC voltage applied to its armature terminals when the motor has fixed field excitation by way of a field winding or a permanent magnet.

The variable voltage applied to the motor armature terminals is commonly obtained from a variety of sources such as a DC generator, a controlled rectifier coupled to AC mains, or from a pulse width modulator which modulates or "chops" a fixed DC voltage so that the duty cycle of "ON" and "OFF" periods will produce a time averaged DC voltage level to the motor armature.

Whatever the source of the variable voltage, most speed control systems which supply DC armature voltage to the motor generally control the magnitude and polarity of the armature voltage by an automatic "feedback" regulator, which measures the voltage at the armature terminals, and adjusts the voltage supplied to the motor to obtain the desired speed.

While the voltage of the armature is a reasonable approximation of the speed of a DC motor, for a fixed armature voltage, the speed will drop as the motor is loaded. This drop in speed is a result of an internal voltage loss in the motor due to load current flowing in the internal resistance of the armature. This internal voltage loss is commonly known as the "IR drop", since its magnitude is equal to the armature current I times the internal armature resistance R.

Since the internal armature resistance is readily measurable, most feedback regulators sense the armature current under load, and add a voltage proportional to the product of this current and the armature resistance, to the voltage applied to the armature at no load, so that the speed will not drop under load. This type of modification of output voltage of the variable voltage source is known as "IR compensation" or "IR drop compensation", since the added voltage compensates for the IR voltage drop in the motor.

IR compensation has been used for several decades and produces very good steady state speed regulation. However, when rapidly varying loads are applied to the motor, the IR compensation may not be fast enough to maintain speed regulation. Transient speed regulation may suffer considerably, and the speed variations of the motor may be unacceptable for the particular purpose for which the motor speed control is being used. An example of an application having rapidly varying loads is an exercise treadmill. Each time a person's foot hits the moving belt of the treadmill and lifts off the belt, there is a large variation in the load applied to the motor driving the belt. This makes it difficult for the motor and control to maintain the speed of the belt constant and at the desired level.

One of the reasons that IR compensation is not completely effective for compensating speed variations due to transient loading is that the DC motor armature contains inductance as well as resistance. The voltage across an inductor is proportional to the rate of change of current, and this "inductive drop" has the same effect as the resistive drop on the armature voltage. It decreases the armature voltage and causes the speed of the motor to drop whenever the load, and therefore, the armature current increases rapidly.

For a situation in which the load on the motor is changing slowly, the rate of change of current is correspondingly slow, and the inductive drop is negligible. IR compensation is adequate in this case. For rapidly changing loads, however, the high rate of change of current may produce a large enough inductive drop that motor speed is materially affected. Additional compensation is necessary to keep motor speed changes to a minimum.

One approach for compensating for the inductive drop is shown in U.S. Pat. No. 5,351,336, entitled "Motor Control Having Improved Speed Regulation Under Intermittent Loading", and dated Sep. 27, 1994. The technique disclosed in this patent measures the armature current, determines its rate of change, and adds a voltage proportional to this rate of change to the armature voltage. It effectively compensates for the inductive drop, so that speed variations are minimized during transient loading.

The above approach requires a knowledge of the magnitude of armature inductance so that the proportionality to the rate of change of current is of the correct magnitude. This means that to be optimum, a given control must be tuned to the particular motor used, and will not be as effective with other motors having different inductances. Moreover, the inductance of a specific motor may not be constant, due to temperature changes, changes in levels of magnetic saturation caused by loading, and other factors. Changes due to such factors can reduce the effectiveness of transient regulation of this type.

SUMMARY OF INVENTION

It is one purpose of this invention, therefore, to provide a DC motor speed control in which the inductive voltage drop is determined in a new and improved way, so that the drop so determined may be used in obtaining enhanced regulation of motor speed under transient loading conditions.

A further purpose of this invention is to provide such a control in which the inductive voltage drop is determined independently of the magnitude of armature inductance, so that different motors, motors combined with inductive input noise filters, or changing characteristics of the same motor will have little or no effect on "inductive drop compensation", and the same control circuit may be used for all conditions with no need for "retuning".

BRIEF DESCRIPTION OF THE DRAWINGS

The invention will be understood from the following detailed description, taken in conjunction with the drawing, in which.

DETAILED DESCRIPTION OF THE PREFERRED EMBODIMENT

Figure 1:
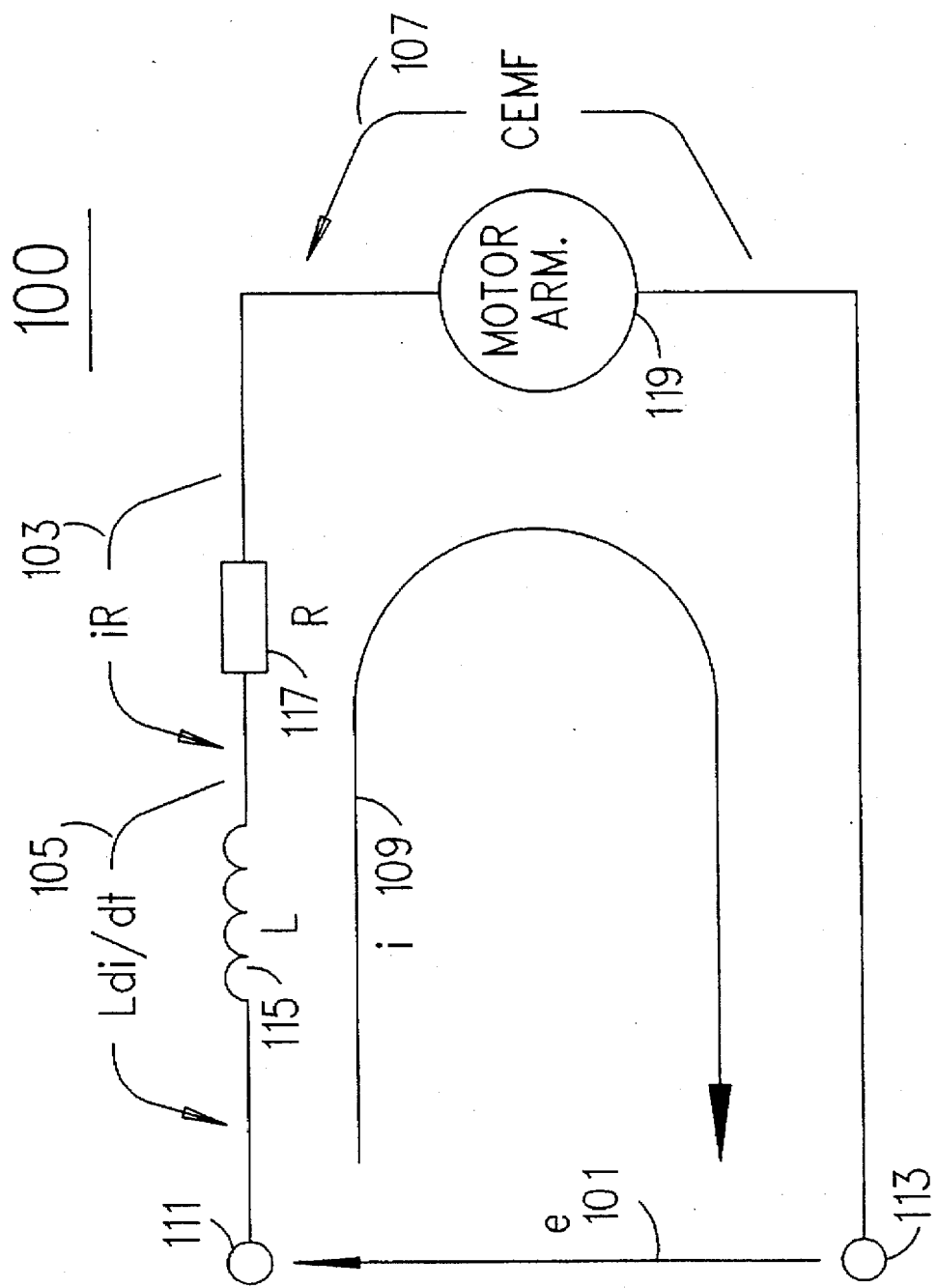
FIG. 1 is an equivalent circuit of a DC motor.

Referring to FIG. 1, the equivalent circuit there shown represents a DC motor 100 supplied with voltage "e", designated 101, at terminals 111 and 113. The motor exhibits armature inductance 115, of magnitude L, and armature resistance 117, of magnitude R. Completing the series circuit is counter emf 107 of the motor, designated CEMF. CEMF 107 is the voltage generated by the motion of the armature conductors in the DC field of the motor, and is a true and accurate measure of the motor speed. Unfortunately, however, it is not available for direct measurement at terminals 111 and 113.

Current "i", designated 109, flows into terminal 111, through armature inductance 115 and resistance 117, through CEMF 107, and out of terminal 113. As current 109 passes through inductance 115, it produces voltage 105, of magnitude Ldi/dt, with the quantity di/dt indicating that this voltage is present only during changes in armature current 109. As current 109 passes through resistor 117, it produces voltage 103, of magnitude iR. The passage of current 109 through the CEMF 107 does not alter the magnitude of this idealized voltage source. The magnitude of the CEMF is related only to the speed of DC motor 100.

The terminal voltage 101 is at all times the sum of voltages 105, 103, and 107 and can be represented by the following equation:

$$e = Ldi/dt + iR + CEMF \quad (1)$$

Equation (1) and those equations following use the conventional designation of terms in which upper case letters indicate DC or average quantities and lower case letters indicate time varying or AC quantities.

As noted earlier, the magnitude of CEMF 107 is a true measure of the motor speed, and if it can be accurately determined, during both steady state and transient loading conditions, it can be used as feedback in a regulating system for regulating the speed of the motor, again during both steady state and transient loading conditions.

Equation (1) can be expanded to show both the DC or average components of the voltages and the AC or transient components as follows:

$$E + e = IR + CEMF + iR + Ldi/dt \quad (2)$$

The left side of equation (2) represents the applied voltage, which is easily measured at the motor terminals, and consists of an average or DC component and a time varying or AC component. The right side of the equation represents the internal motor voltage that result from the applied voltage, and the rotation of the armature. The internal voltages also have DC and AC components.

If the transient, or AC, terms in equation (2) can be accurately determined, the CEMF and therefore the speed, both steady state and transient, can be determined from the solution of equation (2).

In order to determine the transient terms, it is useful to separate Equation (2) into two equations, one representing the DC or steady state quantities and the other representing the AC or transient quantities:

$$E = CEMF + IR \text{ (the DC components)} \quad (3a)$$

and $$e = iR + Ldi/dt \text{ (the AC components)} \quad (3b)$$

As noted earlier, the total applied voltage to the motor E+e, the left side of equation (2), is a voltage that is readily accessible. The transient or AC component of this applied voltage, i.e. that voltage specified in equation (3b), can be separated from the total voltage by one of the circuits of FIGS. 2A and 2B, shown as two possible means of accomplishing this goal.

Figure 2:
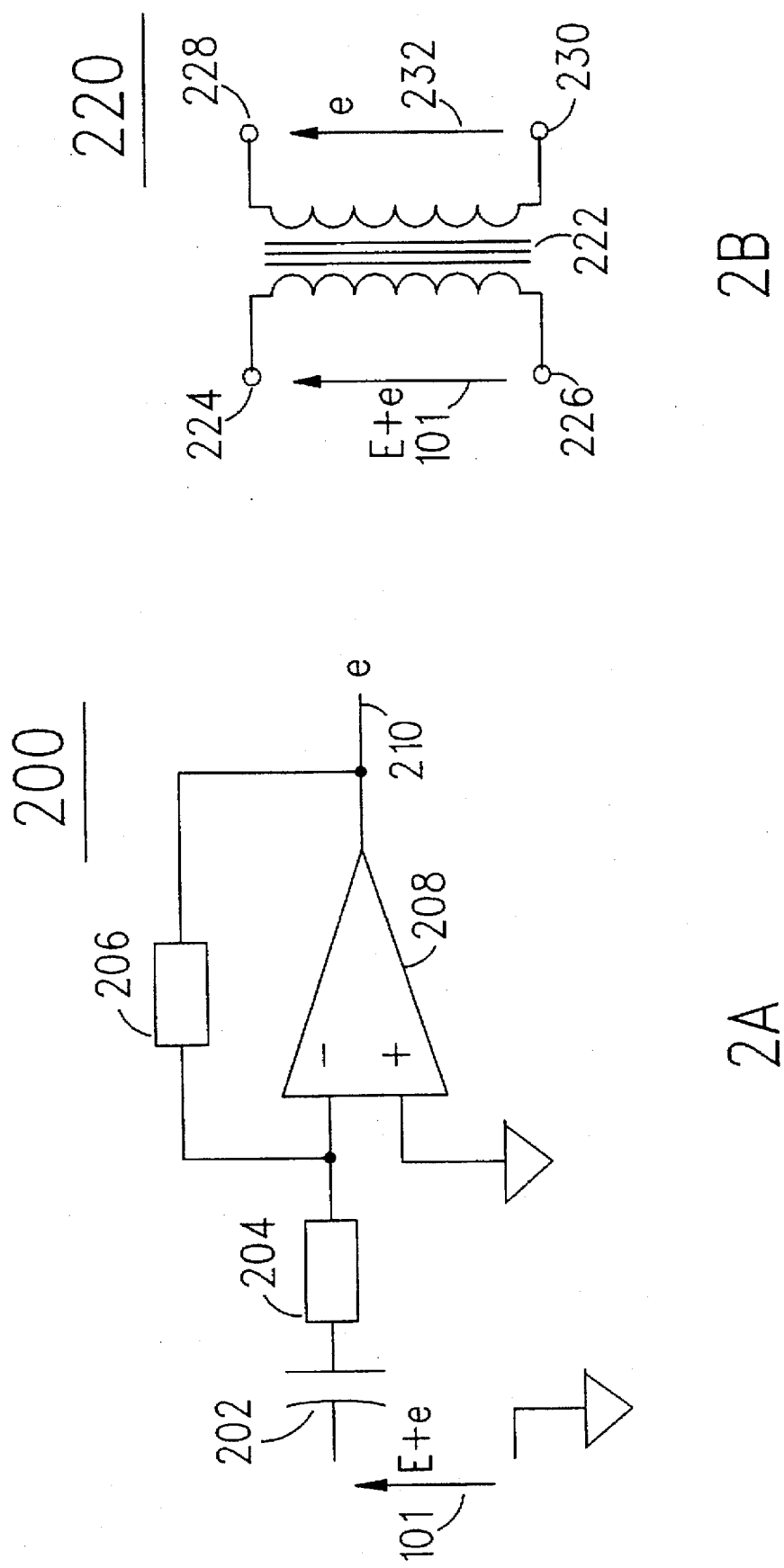
FIGS. 2A and 2B are schematic diagrams showing circuitry for determining the transient portion of the armature voltage applied to a DC motor.

FIG. 2A shows an amplifier circuit 200 that is designed for AC amplification only, with a blocking capacitor 202 to eliminate the DC component of the applied voltage 101. Resistors 204 and 206, acting in conjunction with operational amplifier 208, determine the AC gain of the circuit, while the relative magnitudes of capacitor 202 and resistor 264 determine the frequency response of the amplifier circuit.

The output of amplifier 208, voltage "e" in conductor 210, is thus proportional to only the AC component of the applied voltage and, by equation (3b), is also proportional to the transient voltages in the motor generated by the time varying nature of the armature current.

FIG. 2B shows another circuit for determining the AC component of applied voltage in the form of transformer circuit 220, with the primary winding of transformer 222 connected to the motor terminal voltage 101 at transformer input terminals 224 and 226. As is well known, a transformer does not pass DC from the primary winding to the secondary winding, so only the AC component of voltage 101 appears at the secondary winding of the transformer as voltage 232 at transformer output terminals 228 and 230. Transformer 220 is preferably constructed with an air gap or other means to prevent the DC component of the voltage 101 from saturating its core.

While FIGS. 2A and 2B show two methods of determining the AC component of the motor applied voltage, it should be recognized by one skilled in the art that many other equally effective techniques exist, and their use does not change the basic concept.

Once the AC component of the applied voltage has been determined, it can be electrically subtracted from the total voltage appearing at the motor terminals, leaving only the DC component of the applied voltage, which by equation (3a) comprises the sum of the CEMF and the IR voltage. The IR voltage can then be compensated for in the conventional manner, leaving only the CEMF, which is now accurate for transient as well as steady state conditions.

It is important to note that the magnitude of inductance 115 of motor 100 is of no concern, since by determining the voltage "e" of equation (3b), in the manner described above, the voltage "e", which is proportional to the transient voltage drop, is directly measured, without regard to the value of the inductance L, or the value of R, for that matter. This means that a motor control circuit employing the compensation of the present invention does not require tuning for a specific motor inductance.

Figure 3:
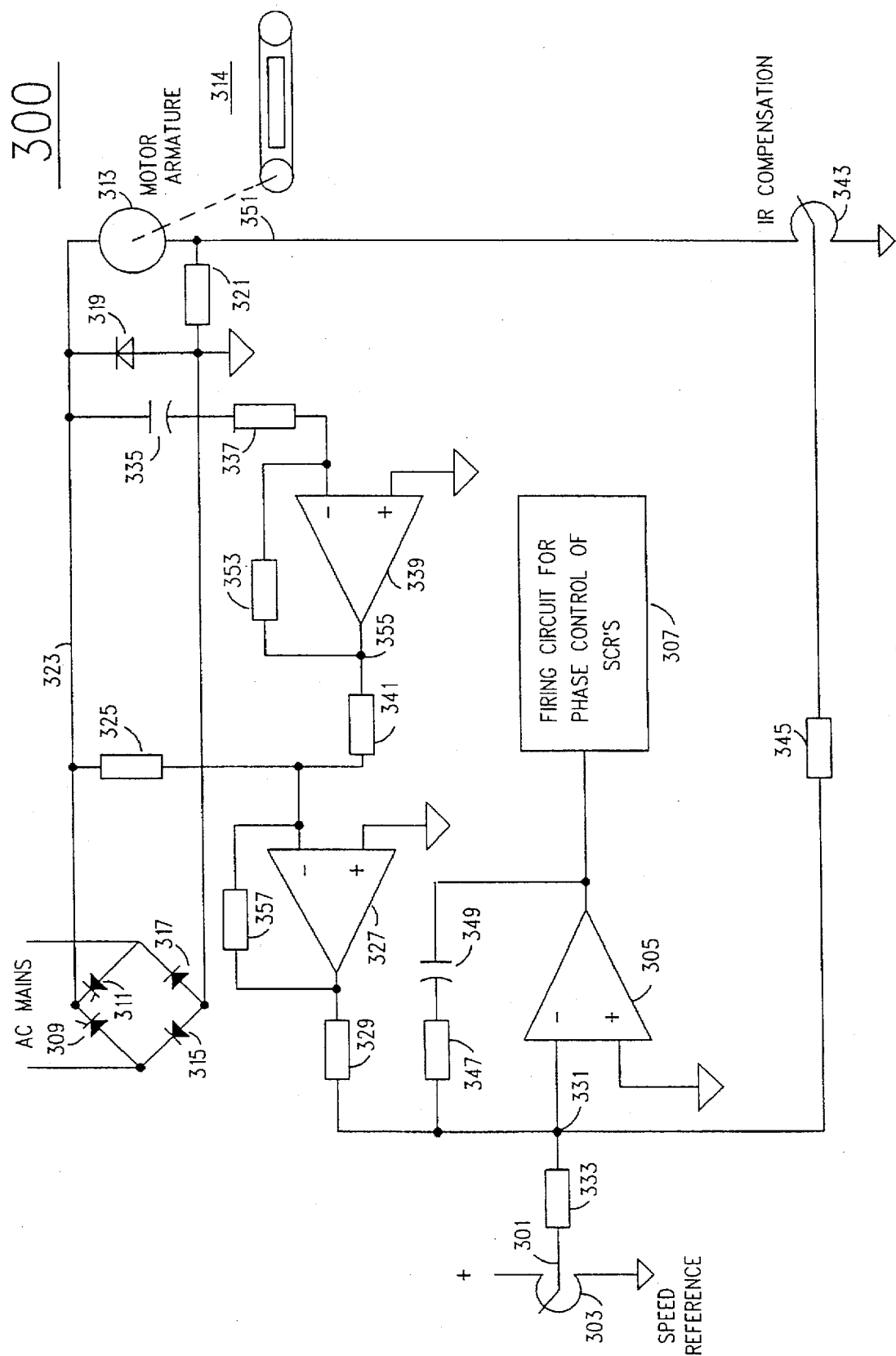
FIG. 3 is a schematic diagram of a DC motor speed control according to the present invention.
Figure 4:
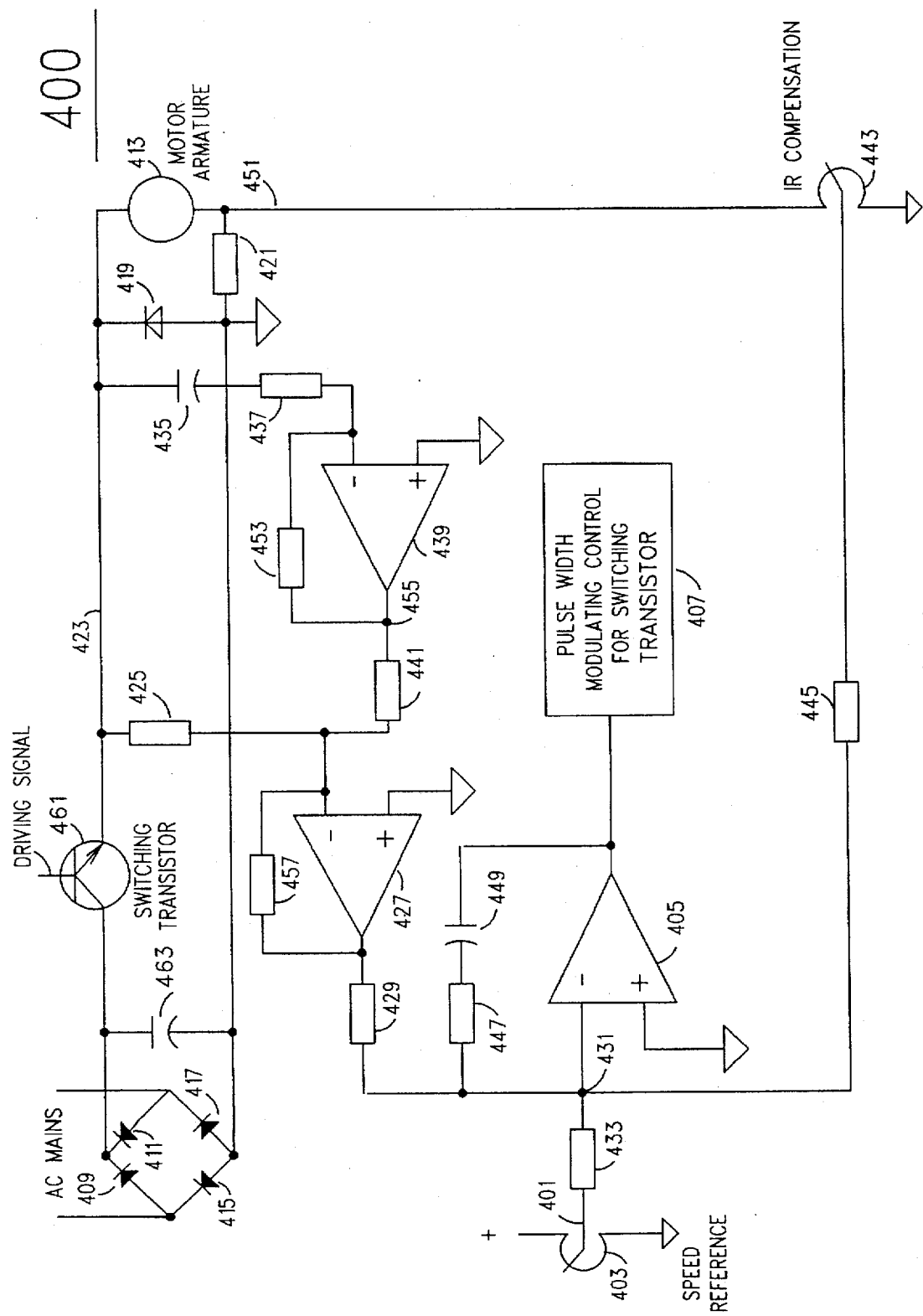
FIG. 4 is a schematic diagram showing an alternative embodiment of the DC motor speed control according to the present invention.

FIG. 3 shows a DC motor speed control circuit, utilizing the technique described above. The circuit of FIG. 3 is a conventional SCR or controlled rectifier circuit to which the transient voltage compensation described above has been added. Although for purposes of illustration, the power source was chosen to be controlled rectification of the AC mains, it should be appreciated that other power sources including pulse width modulated or "chopped" DC may be used as well, without changing the foregoing equations or the operation and results of the present invention. See FIG. 4 showing motor control 400 with pulse width modulator 407 for driving switching transistor 461. The elements of FIG. 4 have been identified with reference numerals corresponding to those of FIG. 3.

In FIG. 3, SCR's 309 and 311, combined with diodes 315 and 317, form a conventional full wave controlled rectifier bridge power supply to motor armature 313. Diode 319 acts as a "free-wheeling" diode to provide a path for the inductive armature current during times when the SCR's are not conducting.

Resistor 321 is connected in series with motor armature 313 to sense the armature current.

Control 300 includes conductor 301 containing a reference voltage signal, selected by speed setting potentiometer 303, which represents the desired speed of the motor. This signal is applied to regulating amplifier 305 with a polarity, in this case positive, which causes amplifier 305 to increase its output to SCR firing circuit 307, which in turn advances the firing angle of SCR's 309 and 311, to increase the voltage to the motor armature 313. Motor armature 313 drives treadmill 314.

Feedback to regulating amplifier 305 consists of several signals. First, resistor 325, connected to conductor 323, provides the total armature voltage, both DC and AC components, for feedback through inverting amplifier 327, and resistor 329, to summing junction 331 of regulating amplifier 305. The inverting amplifier is required to convert the positive polarity of voltage at conductor 323 to a negative polarity to oppose the positive polarity reference signal in conductor 301, applied to through resistor 333 to summing junction 331.

A second feedback signal, which is the AC component "e" of the armature voltage in conductor 323, is derived as follows. The total armature voltage in conductor 323 is connected to inverting amplifier 208 through capacitor 202 and resistor 204. Capacitor 202 serves to block the DC component of the armature voltage, so that only the AC component "e" of the armature voltage is supplied to amplifier 208. Because amplifier 208 is an inverting amplifier, the polarity of the AC component of the armature voltage at the amplifier output is opposite the polarity of the AC component of the signal connected to amplifier 327 through resistor 325.

The output of amplifier 208 is supplied to amplifier 327 through resistor 341. Amplifier 327 thus receives a signal representing the total armature voltage, both AC and DC components, through resistor 325, and a signal representing only the AC component of armature voltage from amplifier 208, through resistor 341. The signal from amplifier 208 through resistor 341 is of a polarity opposite to the polarity of the signal through resistor 325.

The values of resistors are selected so that the magnitude of the signal to amplifier 327 through resistor 341 from amplifier 208 is exactly the same as the magnitude of the AC component of the signal to amplifier 327 through resistor 325, but of opposite polarity, since the polarity of the signal from amplifier 208 has been reversed by the inverting action of amplifier 208. The two signals thus oppose each other so that the AC component of the armature voltage signal is completely missing at the output of amplifier 327. Only the DC component of armature voltage remains, and according to equation (3a) this signal represents the counter emf CEMF plus the IR drop IR. Resistor 357, connected as feedback for amplifier 327 determines its gain as an amplifier whose only purpose is to determine the algebraic sum of the total armature voltage "E+e" and the inverted AC component "e".

The remaining feedback signal is the IR compensation signal required to provide an increase in applied voltage in response to increased loading, thereby to overcome the voltage drop in the internal armature resistance due to armature current flow.

IR compensation potentiometer 343 selects a portion of the voltage in conductor 351 developed across sensing resistor 321, and provides this signal through resistor 345 to summing junction 331. Because the voltage at conductor 351 is of positive polarity, it is additive to the reference signal in conductor 301, and causes the voltage to increase with increasing load. Potentiometer 343 is adjusted so that this increased voltage is just enough to compensate for the IR drop in the internal armature resistance.

Amplifier 208 is included in FIG. 3 primarily to illustrate the concept of subtracting the transient portion of the armature voltage from the total armature voltage to obtain the average armature voltage. Since the transient signal through capacitor 202 and resistor 204 passes through two inverting amplifiers, namely amplifiers 208 and 327, it arrives at summing junction 331 non-inverted.

For this reason, in an actual circuit, the signal through capacitor 202 and resistor 204 can be directly applied to summing junction 331, and amplifier 208 eliminated. The important feature is that the transient portion of the armature voltage signal is utilized in opposition to the entire armature voltage signal, by whatever method is most practical in a specific circuit.

Regulating amplifier 305 has feedback in the form of resistor 347 and capacitor 349, to shape its frequency response characteristics for proper closed loop response of the regulator.

Conventional prior art circuits, without the cancellation of the AC component of the armature voltage feedback signal, required substantial reduction in the frequency response of regulating amplifier 305, in order to avoid saturating the amplifier with the AC component of the armature feedback signal. Because of this poor frequency response, it was not uncommon to have a response time to load changes of a quarter to half a second. With this long time to respond, transient load changes of 20 or 30 milliseconds were almost completely ignored.

When the AC component of the armature feedback signal has been eliminated as in the present invention, the frequency response of regulating amplifier 305 can be increased to point where its time of response to load changes can be reduced to less than 15 milliseconds, and transient loading conditions are easily compensated.

I claim:

1. A control providing improved speed regulation under transient loading conditions to a DC motor, said DC motor having an armature circuit with resistance and inductance, said DC motor being energized by applying an armature voltage to the armature circuit to pass an armature current through the armature circuit, said control comprising:

a regulating means having an output signal controlling the armature voltage applied to the motor;

means for providing a speed reference signal corresponding to a desired speed of said motor to said regulating means;

means for sensing the armature voltage applied to the motor and for providing an armature voltage feedback signal to said regulating means in opposition to said speed reference signal to produce an error signal for operating said regulating means to establish the armature voltage applied to the motor;

means for sensing the armature current of the motor;

means coupled to said armature current sensing means for providing an IR compensating signal to said regulating means to compensate for a voltage drop resulting from the resistance of the armature circuit, said IR compensating signal being provided in a manner that is additive to said speed reference signal; and means coupled to said armature voltage sensing means for obtaining a signal corresponding to an additional voltage drop resulting from the inductance of the armature circuit during transient conditions and for providing said signal corresponding to the additional voltage drop to said regulating means to compensate for the voltage drop resulting from the inductance of the armature circuit, said signal corresponding to the additional voltage drop being provided to said regulating means in opposition to said armature voltage feedback signal the output signal of said regulating means being altered by the addition of said IR compensating signal to said speed reference signal and by the opposition of said signal corresponding to the additional voltage drop to said armature voltage feedback signal for establishing the speed of said motor at the desired speed corresponding to said speed reference signal.

2. The control according to claim 1 wherein said means for obtaining a signal corresponding to the additional voltage drop comprises means for blocking a DC portion of said armature voltage feedback signal, and utilizing a remaining time variant portion of said armature voltage feedback signal as said signal corresponding to said additional voltage drop.

3. The control according to claim 2, wherein said DC portion blocking means comprises amplifier means in which an amplification of DC signals is blocked.

4. The control according to claim 2 wherein said DC portion blocking means comprises a transformer having a primary winding coupled to said armature voltage sensing means, and a secondary winding providing said signal corresponding to said additional voltage drop.

5. The control according to claim 1 wherein said control further includes means for applying an armature voltage to the DC motor in accordance with said output signal.

6. The control according to claim 5 wherein said armature voltage application means includes means for carrying out controlled rectification of an AC voltage in AC mains coupled to said control for applying the armature voltage to the DC motor.

7. The control according to claim 6 wherein said armature voltage application means includes pulse width modulating means for applying the armature voltage to the DC motor.

8. A control according to claim 1 further defined as one for providing speed regulation to a DC motor coupled to a treadmill.

9. A control according to claim 5 further defined as one for providing speed regulation to a DC motor coupled to a treadmill.

10. A control providing improved speed regulation under transient loading conditions to a DC motor, said DC motor having an armature circuit with resistance and inductance, said DC motor being energized by applying an armature voltage to the armature circuit to pass an armature current through the armature circuit, said control comprising:

a regulating means having an output signal controlling the armature voltage applied to the motor;

means for providing a speed reference signal corresponding to a desired speed of said motor to said regulating means;

means for providing a speed feedback signal to said regulating means in opposition to said speed reference signal to produce an error signal for operating said regulating means to establish the armature voltage applied to the motor;

means for sensing the armature voltage applied to the motor;

means coupled to said armature voltage sensing means for obtaining a signal corresponding to a voltage drop resulting from the inductance of the armature circuit during transient conditions and for providing said signal corresponding to the voltage drop to said regulating means to compensate for the voltage drop resulting from the inductance of the armature circuit, said signal corresponding to the voltage drop being provided to said regulating means in opposition to said speed feedback signal the output signal of said regulating means being altered by the opposition of said signal corresponding to the voltage drop to the speed feedback signal for establishing the speed of said motor at the desired speed corresponding to the speed reference signal.

11. The control according to claim 10 wherein said means for obtaining a signal corresponding to the voltage drop comprises means for blocking a DC portion of the armature voltage sensed by said armature voltage sensing means, and utilizing a remaining time variant portion of the armature voltage as said signal corresponding to said voltage drop.

12. The control according to claim 10, wherein said DC portion blocking means comprises amplifier means in which an amplification of DC signals is blocked.

13. The control according to claim 11 wherein said DC portion blocking means comprises a transformer having a primary winding coupled to said armature voltage sensing means, and a secondary winding providing said signal corresponding to the voltage drop.

14. The control according to claim 10 wherein said control further includes means for applying an armature voltage to the DC motor in accordance with said output signal.

15. The control according to claim 14 wherein said armature voltage application means includes means for carrying out controlled rectification of an AC voltage in AC mains coupled to said control for applying the armature voltage to DC motor.

16. The control according to claim 14 wherein said armature voltage application means includes pulse width modulating means for applying the armature voltage to the DC motor.

17. A control according to claim 10 further defined as one for providing speed regulation to a DC motor coupled to a treadmill.

* * * * *